United States Patent [19]

Gomez et al.

[11] Patent Number: 5,196,842

[45] Date of Patent: Mar. 23, 1993

[54] PAGER CAPABLE OF OPERATING IN MULTIPLE PAGING SYSTEMS

[75] Inventors: Fernando A. Gomez, West Palm Beach; Tommy R. Rudy; Thomas F. Holmes, both of Boynton Beach, all of Fla.

[73] Assignee: Motorola, Inc., Schaumburg, Ill.

[21] Appl. No.: 733,921

[22] Filed: Jul. 22, 1991

[51] Int. Cl.[5] ............................................. H04Q 7/00
[52] U.S. Cl. ............................. 340/825.44; 340/311.1; 455/56.1
[58] Field of Search .................... 340/825.44, 825.04, 340/311.1; 455/56, 56.1; 370/110.1

[56] References Cited

U.S. PATENT DOCUMENTS

| | | | |
|---|---|---|---|
| 4,178,476 | 12/1979 | Frost | 340/825.44 |
| 4,518,961 | 5/1985 | Davis et al. | 340/825.44 |
| 4,644,347 | 2/1987 | Lucas et al. | 340/825.44 |
| 4,713,808 | 12/1987 | Gaskill et al. | 340/825.44 |
| 4,891,638 | 1/1990 | Davis | 340/825.44 |
| 4,977,612 | 12/1990 | Wilson | 340/825.04 |

Primary Examiner—Donald J. Yusko
Assistant Examiner—Edwin C. Holloway, III
Attorney, Agent, or Firm—Pedro P. Hernandez

[57] ABSTRACT

A pager (400) capable of operating in a plurality of paging systems (210, 212, and 214) includes a receiver (404) for receiving information messages which include idle words from one of the paging systems. Upon receiving the information messages the pager (400) decodes the information messages in order to determine the system identification information contained in the idle word. The pager (400) then compares the decoded system identification information with the unique paging system identification number presently being utilized by the pager (400). If the system identification information matches the unique paging system identification number presently being utilized by the pager, the pager (400) remains in the present paging system. If the data does not match, the pager uses controller (410) to determine if any of the stored sets of system configuration parameters which are each associated with a unique paging system identification number matches the decoded system identification information. If a match is found, the controller (410) automatically changes the system configuration parameters to match those associated with the new paging system identification number.

8 Claims, 4 Drawing Sheets

PAGER CAPABLE OF OPERATING IN MULTIPLE PAGING SYSTEMS

TECHNICAL FIELD

This invention relates generally to the field of radio paging, and more specifically to a pager capable of operating in multiple paging systems.

BACKGROUND

The standard message coding format for the national paging system of the British Post Office, and which is widely used by many radio common carrier (RCC) service providers throughout the world is shown in FIG. 1A, and is commonly known as the POCSAG signaling protocol, or format. Each transmission consists of a preamble portion 102 followed by one or more batches 104 and 106 of selectively arranged code words. The preamble 102 is a series of logic states (either 1's and 0's) which has a total duration of at least 576 bits (shown in 108). The preamble 102 permits the pagers receiving the preamble to attain bit synchronization and also helps the pagers acquire word synchronization. A code word 110 is a 32 bit data sequence which contains information either for synchronization or for addressing an individual pager. Each batch 104 and 106 begins with a 32 bit synchronization code word 114 which is an invariant predetermined sequence. A batch 112 comprises one synchronization code word 114 and sixteen address or data code words which are subdivided into eight separate frames each containing two address code words, or an address code word and a data code word, or two data code words. Subsequent batches in any message transmission contain the same format of a 32 bit synchronization word followed by eight frames, each containing two address code words, or an address code word and a data word, or two data words, for a total of 16 address and/or data code words in a batch.

Code words 110, either address or data, are grouped into eight frames numbered 0 to 7. The entire pager address population is similarly divided into eight possible groups, thereby providing each group with a battery saving capability. Each pager address is allocated to one of the corresponding eight frames according to the three least significant bits of its 21 bit code word identity. Thus, all pagers having addresses which end in 000 would be positioned in frame 0, and similarly, all pagers having an address code word ending in 111 would be in frame 7.

Address code words 110 have a 32 bit structure and bit 1 of an address code word is always zero. Bits 2-19 are address bits corresponding to the 18 most significant bits of the 21 bit identity sequence assigned to an individual pager. The three least significant bits are not transmitted since they merely serve to define the frame in which the address code word must be transmitted and are therefore derivable from the frame position in a batch. Bits 20 and 21 are function bits which are used to select the required addresses from the four possible addresses assigned to the pager. Bits 22 to 31 are parity check bits and the final bit, bit 32, is chosen to give even parity. The decoding system will only examine address code words in a designated frame, and therefore, each pager's address code words is only transmitted in the frame that is allocated to that code word format.

A data code word also has a 32 bit structure, however, bit 1 of the data code word is always 1, identifying the code word as a data code word. Bits 2-21 are the data bits corresponding to the message digits, as in a numeric page, or the message characters, as in an alphanumeric message. Five 4-bit BCD numeric digits, or almost three 7-bit ASCII alphanumeric characters can be transmitted in the data bits of each data code word. Bits 22 to 31 are parity check bits and the final bit, bit 32, is chosen to give even parity, as for the address code word.

The 21 bit binary sequence for pager identity in the POCSAG signalling protocol allows for over two million combinations of possible addresses for pagers. The addition of the two function bits provides a total of eight million message combinations comprising batch signalling functions and pager addresses.

In the absence of an address codeword or message codeword, an idle codeword is transmitted. The idle codeword is a valid address codeword, which is not allocated to pagers and has the structure shown in FIG. 1B.

The POCSAG signalling protocol has been widely used in local area paging systems, as well as have other signalling protocols (GOLAY, etc.), to provide local message delivery to pagers assigned to operate within the local area paging system. Because of the address capacity provided by POCSAG signalling protocol, and other digital signalling protocols, local area systems providing wide area paging system coverage to large metropolitan areas encompassing many towns and cities have become feasible. While the local area paging systems as described have fulfilled the needs of local paging users, especially in the larger metropolitan areas, the needs of users that move from one paging system to another paging system have not been met.

With the advent of synthesized pagers having the capabilities to scan or manually change frequencies, codes, coding formats and options which are configured to the different frequencies, Radio Common Carriers (RCC's) are searching for ways to increase revenues by offering multiple coverage areas (regional, national, or international) with one pager. For example, a businessman who travels between two metropolitan areas (e.g. New York and Chicago) that have local paging systems having different operating parameters, requires two pagers to stay in constant contact, or must use the more expensive nationwide paging services that are available. An example of a pager which can switch between a nation wide paging system and a local paging system is disclosed in U.S. Pat. No. 4,644,347 by Lucas, et al. entitled "Multiple Frequency Message System".

A problem arises with the prior art when a user needs to operate in a plurality of independent paging systems. A user that is constantly changing locations amongst a plurality of different independent paging systems requires someway of being able to receive paging messages without having to either manually switch systems or having in anyway coordinate his present location amongst the paging systems. A need therefore exists, for a pager which can automatically operate in multiple independent paging systems without requiring any intervention by the pager user.

SUMMARY OF THE INVENTION

The present invention provides an improved pager capable of operating in a plurality of independent paging systems. In the present invention the pager is capable of operating in a plurality of paging systems, each of the paging systems transmitting information messages which include idle messages during periods of idle system activity and each of the paging systems having unique system identification information that is transmitted periodically via the idle messages. The pager comprises a receiver means for receiving information messages from at least one of the plurality of paging systems, and a decoder means for decoding the information messages received by the receiver means in order to determine the unique system identification information contained in the idle messages. The pager further comprises a storage means, coupled to the receiver means, for storing a plurality of system configuration parameters, each set of system configuration parameters being associated with a unique paging system identification number and a comparison means for comparing the unique system identification information decoded by the decoder means with the unique paging system identification number presently being utilized by the pager. The controller means being responsive to the comparison means for causing the pager to continue receiving information messages from the presently selected paging system if the unique paging system identification number presently being utilized by the pager matches the unique system identification information decoded by the decoder means and for automatically changing the corresponding system configuration parameters of the pager if the unique pager system identification number presently being utilized does not match the unique system identification information decoded by the decoder means and the unique system identification information previously decoded matches one of the unique pager system identification numbers stored in the storage means. Finally, the pager includes a counter means for generating a periodic pager counter interval during which the pager decodes information messages in order to determine if the pager is still in the proper paging system by comparing the unique system identification information with the unique paging system identification number presently being utilized by the pager.

DETAILED DESCRIPTION OF THE PREFERRED EMBODIMENT

Figure 2:
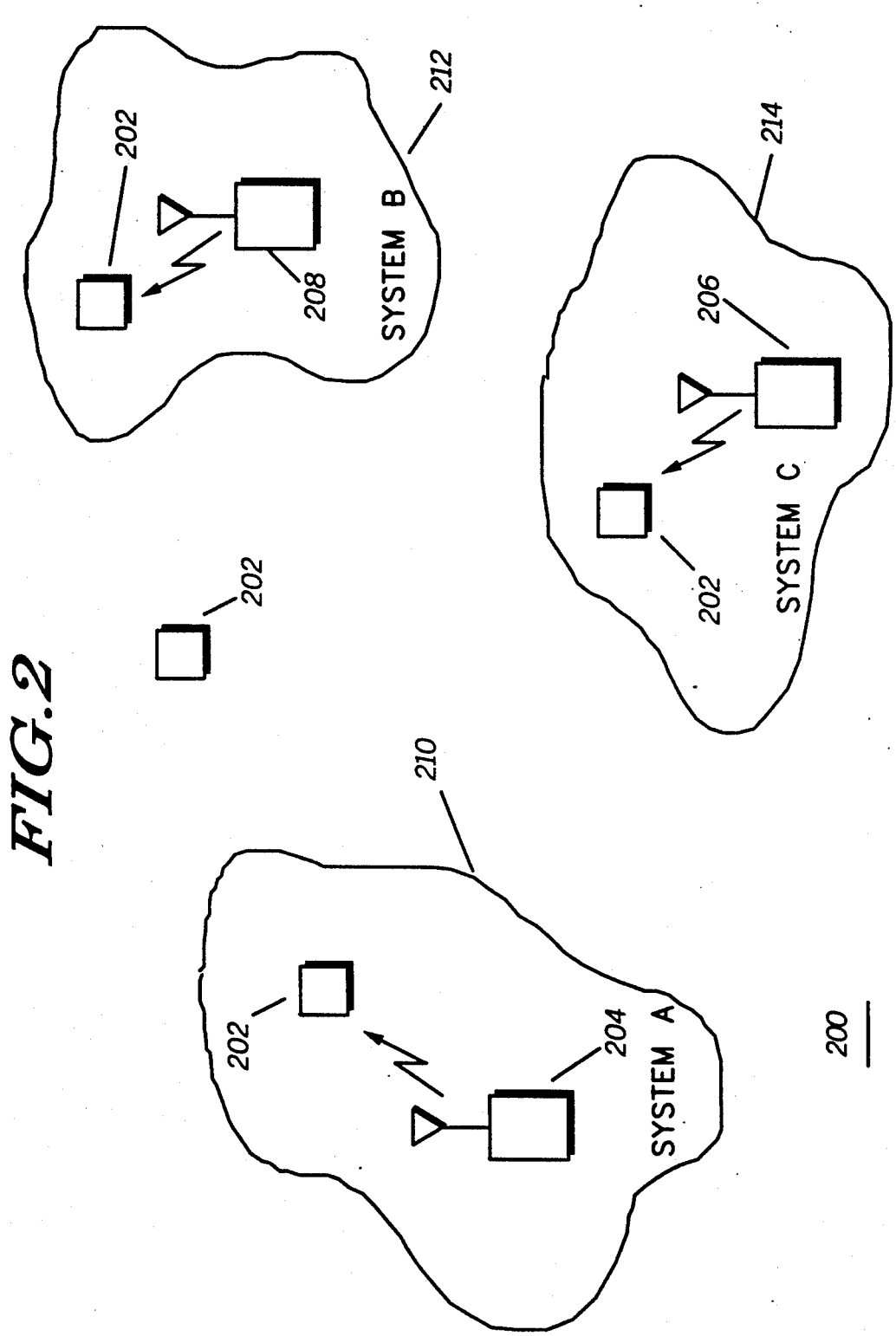
FIG. 2 is a drawing of multiple paging systems in accordance with the present invention.

Referring now to the drawings, FIG. 2 shows a multiple paging systems in accordance with the present invention. The multiple paging systems includes paging system "A" 210, paging system "B" 212 and paging system "C" 214. Each paging system includes a central paging terminal 204, 208, and 206, respectively. The respective paging terminals 204, 208, and 206 are responsible for transmitting information messages to all of the pagers assigned to their particular systems. The diagram shows a plurality of pagers 202 operating in the different paging systems (210, 212, and 214). Each of the paging systems can be geographically apart from each other, and can have totally different operating frequencies, and different operating parameters such as different paging protocols, options, etc. Also shown in FIG. 2 is a plurality of pagers 202 capable of operating in any of the plurality of paging systems (210, 212, and 214), in accordance with the present invention.

Figure 3:
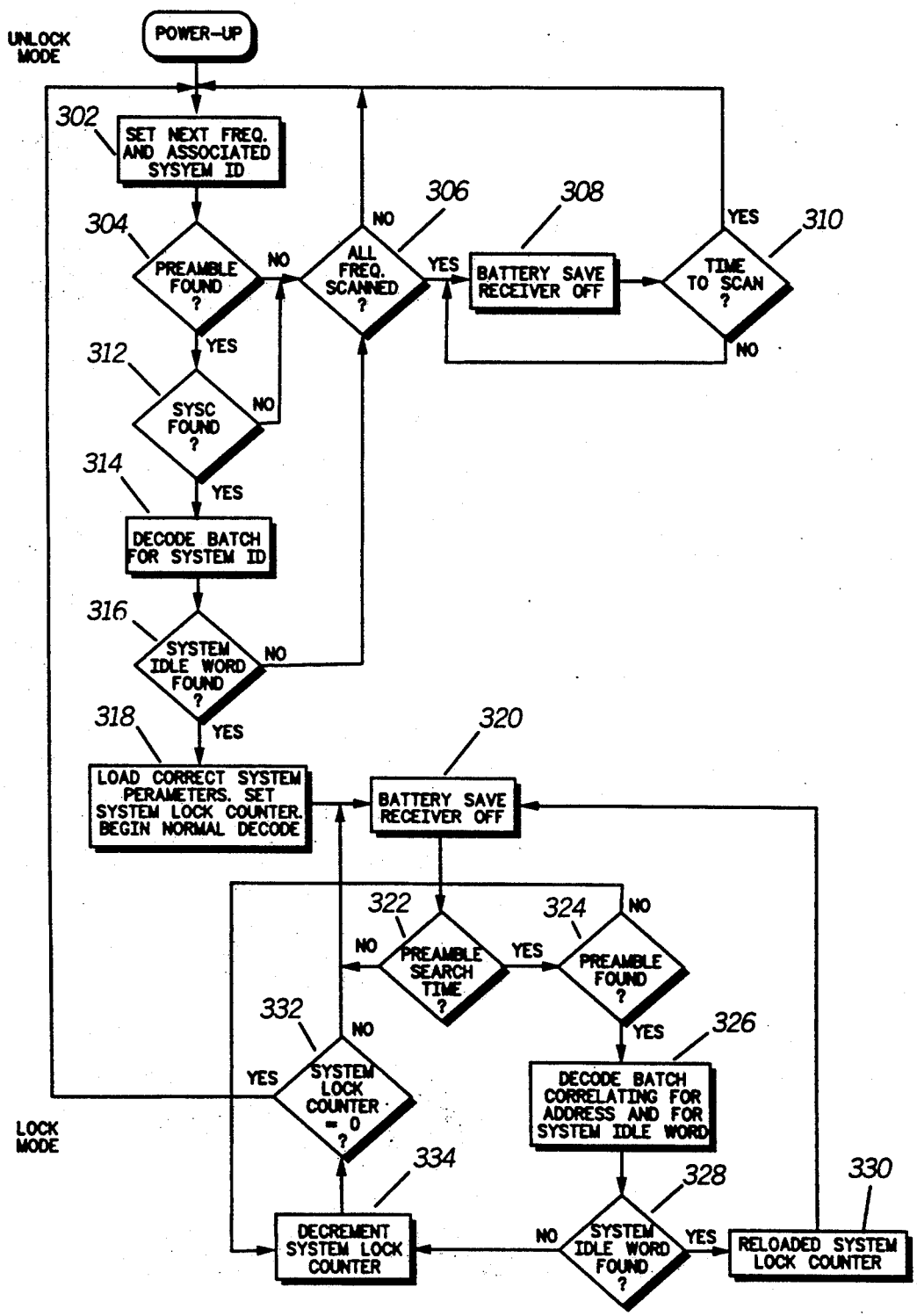
FIG. 3 is a flow diagram showing a typical operation sequence in accordance with the present invention.

In FIG. 3, a typical operating sequence for the present invention is shown. In the following discussion it will be assumed that the pager 202 is operating in a POCSAG paging system although those skilled in the art will appreciate that other similar types of paging systems can be modified to work in a similar fashion as disclosed below. In step 302, after the pager is powered-up, the pager 202 sets its default frequency which includes an associated unique paging system identification number (also called the system ID) which is stored in the pager and any other system configuration parameters such as options, paging code number, coding protocol (POCSAG, GOLAY, etc.) coding options, etc. In decision step 304, pager 202 determines if a preamble has been received. If, after waiting a predetermined period of time for a preamble to be received, no preamble is received the sequence moves to step 306 in order to determine if all of the frequencies in the scan list which are stored in the pager have been scanned. If the answer in step 306 is yes (all frequencies have been scanned) pager 202 is placed into a conventional battery saver mode which includes shutting off portions of the receiver section for a certain period of time in order to conserve battery life. In decision step 310, a time to scan timer stored in the pager is compared to see if it has expired, if the timer has expired the routine returns to step 302. If the timer has not expired (not yet time to scan again) pager 202 is left in the battery saver mode. If in step 306, it is determined that all frequencies stored in the pager's scan list have not been scanned, the routine returns to step 302 and changes the system operating parameters of the pager 202 with those associated with the new frequency. The system operating parameters can include the frequency of operation of the pager, system identification number, paging options enabled, the pager code number, paging protocol to use (POCSAG, GOLAY, etc.) and all such related information.

If in decision step 304, a preamble is received the pager gets into bit synchronization, and the routine moves on to decision step 312 in order to determine if word synchronization can be achieved. If in step 304 a preamble is found the pager will know that it is presently operating on a frequency that matches a local paging system frequency. At this point pager 202 does not know if it is in an authorized paging system. If no synchronization is found in step 312, the routine moves back to step 306. If in step 312 synchronization is achieved, step 314 decodes the received batch in order to decode the system identification information (system ID) contained in the idle words. At this point in the sequence pager 202 knows that it is in a paging system that has the same operating frequency and paging protocol as presently selected by the pager 202. The routine then moves to decision step 316 where it is determined if the idle word having the system ID (unique system identification) information can be found, if the idle word is not found, the routine moves back to decision step 306. If the idle word is found and the system identification information is properly decoded by pager 202, in step 318 the pager loads the correct system parameters associated with the system ID. A system lock counter is also set, and the pager begins normal decoding of incoming messages with the new parameters. Typically, no change in the operating parameters occurs at this point since most paging systems that pager 202 will normally be operating in will have different operating frequencies. A change of operating parameters will occur only if pager 202 is authorized in different paging systems utilizing the same operating frequencies (but different system ID's) in different geographic locations. The types of system operating parameters that are changed can include paging features such as system features (e.g. out of range option may be offered in one system but not in another, amount of time pager is left in a sleep mode, etc), pager options, and other pager features commonly utilized.

The system lock counter stored in pager 202 is primarily used for generating a periodic pager counter interval during which the pager decodes information messages in order to determine if the pager is still in the proper paging system. This is done by comparing the unique system identification information with the unique paging system identification number presently being utilized by the pager.

The pager in step 320 then goes into its normal battery saver mode to conserve energy as is typically done in most paging systems. In decision step 322, it is determined if it is time to do another preamble search. If the preamble search time counter has not expired in step 322, in step 332 the system lock counter is decoded to determine if the counter has reached zero (lock counter has expired). If the answer is yes, the routine once again moves to step 302. If in step 332 the system lock counter does not equal zero, the routine goes to step 320 where the radio is placed in a battery saver mode.

If in step 322 it is determined that it is time once again to decode a new preamble, the routine moves to decision step 324. If in step 324 a preamble is found, in step 326 the incoming batch is decoded and a correlation of the address and system idle words is done by the pager 202. In decision step 328 it is then determined if the system idle word is found. If an idle word having the correct unique system identification information (system ID) is found, in step 330 the system lock counter is reloaded. If in step 328 no system idle word is found, in step 334 the system lock counter is decrement and the routine moves to step 332 to determine if the system lock counter has reached zero. Once the system lock counter has reached zero the pager leaves the system lock mode and goes back to step 302 in order to find the new system (which normally occurs when the pager user has moved geographic locations out of the previous system).

Figure 1:
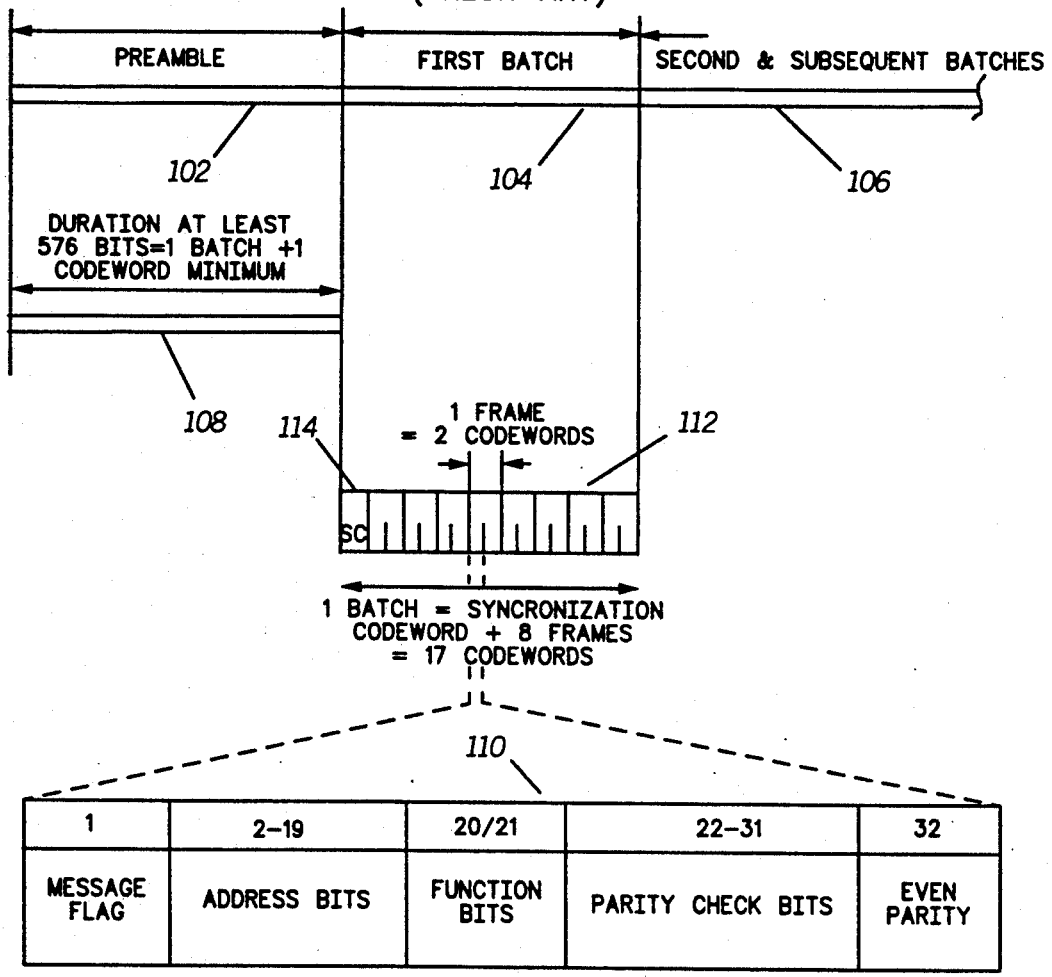
FIG. 1A comprises a descriptive diagram of the POCSAG signaling protocol.
FIG. 1B shows a diagram of a standard POCSAG idle word.

As an overview of the above routine, a typical example will now be discussed. Assuming a pager user needs to travel from his normal coverage area to a secondary coverage area (e.g. Atlanta to New York City). While traveling, the user will encounter multiple paging systems which are not subscribed to by the user. The invention will allow the pager to determine the appropriate systems for the user by "unlocking" the local system parameters to allow for scanning of other user subscribed services (e.g. regional coverage, other systems. etc.). In the preferred embodiment the invention will use the existing POCSAG format by altering only the idle word that is normally used to fill empty slots within batches. A unique idle word will be assigned to each paging system in order to provide for unique system identification. The standard idle word shown in FIG. 1B would have certain bits modified which would be used to denote the different system ID's. This approach would require all systems that want to employ the present invention to be coordinated (each system will require a unique system ID). A second approach would be to provide a unique system identifier immediately after the idle words. For example, an extra data packet would immediately follow the idle word and would inform the pagers of the system identification information. The benefit of using the former approach is that it would require less modification to existing paging systems in order to implement the present invention.

In order to guarantee the reception of the system ID by pager, 202 several approaches can be utilized. The preferred approach will have the paging terminals (204, 206, and 208) transmit the system ID in the first slot of each batch, thereby providing a method to unlock a pager and determine the correct system the pager is currently in. For example, when the user is traveling from system to system, the second method would require the paging terminal to send system ID's ever so often, for example every 15 minutes (or any other period of time) to guarantee "system lock" within the 15 minutes of being in range of the new coverage system. This approach would require less decoding by the pagers, but would give the pagers a window (in this example 15 minutes) of not receiving information if the pager user moves out of one paging system to another one. This would not be much of a problem when the user takes longer then the programmed time to reach the new system (at that point the pager would be unlocked looking for a new system). The third approach would require the paging terminal (204, 206, and 208) to send system ID's every 15 minutes during idle periods. If the system does not find idle periods, a forced system ID batch could then be sent by the paging terminal in order to guarantee that the pager receive the system identification information.

With any of the above scenarios, the pager can make a logical decision whether to stay on a particular system (lock mode), continue to roam, or extend "sleeptime". For example, a pager can be programmed for multiple regions such as for example: L.A.—system ID #5, and New York City—system ID #9. When the user leaves the L.A. region and after for example 15 minutes of not decoding the pager ID #5, the pager enters the roam mode (unlocked mode) previously described in FIG. 3. A possibility may occur of the pager receiving a preamble of a non-subscribed paging system but not seeing the correct system ID. In this case, the pager would continue to roam since the pager not only must be able to receive a preamble must also match system identification information. Only when the pager receives the correct system ID will the pager then switch to the new system parameters (in this case the N.Y. City area paging system operating parameters).

The pager can then associate a different and distinct set of features, code number and operating frequency with the new system. Thus, each system can set aside codes for roaming in a given area without fear of duplication. Users can have unique options or features in one system while not having them in other systems. For example, out of range can be an option in the L.A. system but not in the New York system which can be stored in the individual pager 202.

Figure 4:
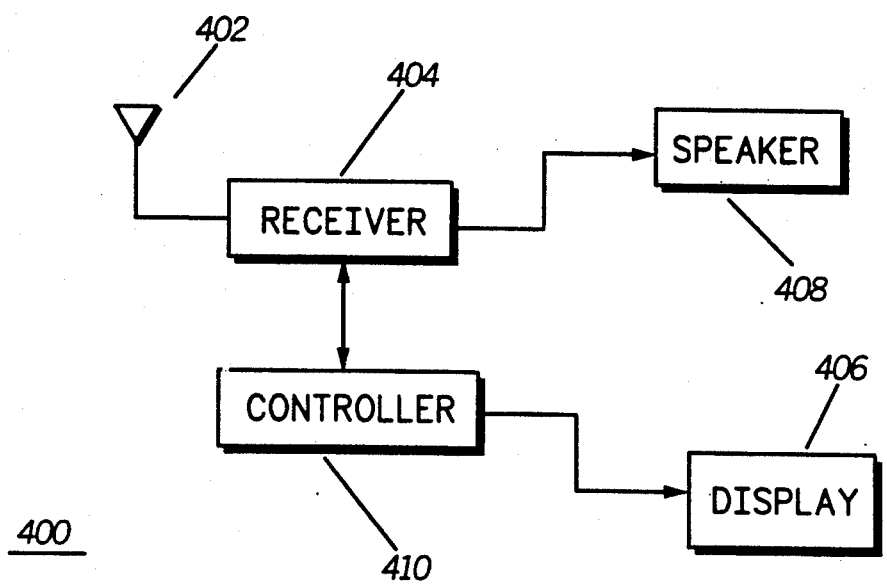
FIG. 4 is a block diagram of a pager in accordance with the present invention.

In FIG. 4 a block diagram of a pager 400 in accordance with the present invention is shown. Pager 400 is similar to pager 202 previously discussed above. Pager 400 includes a receiver means such as receiver 404. Receiver 404 has an antenna 402 coupled to it which is used for receiving radio frequency signals which are then sent to receiver 404. Coupled to receiver 404 is a controller means such as controller 410 which is preferably a microprocessor or microcontroller having associated memory, I/O, and timer capabilities as is well known in the art. Controller 410 also includes a storage means, such as a memory section for storing information such as the plurality of system configuration parameters, required by pager 400 in order to operate in the plurality of paging systems. Each set of system operating parameters is preferably indexed according to the unique system identification numbers (system ID's) in which the pager is capable of operating. Also stored in controller 410 are conventional comparison and decoding algorithms which act as the comparison and decoding means for comparing and decoding the incoming information messages in order to determine the unique system identification information stored in the incoming information messages and comparing the system identification information to the system identification numbers stored in pager 400. Controller 410 then determines if the pager is to remain in the currently selected system or begin to roam in order to find the system the pager user is geographically located in at the present moment. Controller 410 can also determine if the present system that is being decoded (if it happens that one of the systems he moves through has the same frequency of operation as one of the systems stored in the pager) is a system the pager is authorized to be on.

Controller 410 also includes a counter means, preferably in the form of a built-in timer which is part of controller 410 and which is operated using a conventional algorithm which is stored in the controller's memory locations. The counter generates a periodic pager counter interval during which the pager decodes information messages in order to determine if the pager is still in the proper paging system.

The above discussed invention allows for a pager to operate in a plurality of different paging systems, thereby allowing the pager user the capability of being able to move from system to system. Since the pager automatically scans for the system identification number using a predetermined routine, the user is almost guaranteed of receiving any pages addressed to his pager once he is inside a new system. The present invention automatically switches the pager's operating parameters according to the decoded system ID.

What is claimed is:

1. A pager capable of operating in a plurality of paging systems, each of the paging systems transmitting information messages which include idle messages during periods of idle system activity, each of the paging systems having unique system identification information that is transmitted periodically via the idle messages, comprising:

receiver means for receiving information messages from at least one of the plurality of paging systems;

decoder means for decoding the information messages received by the receiver means in order to determine the unique system identification information contained in the idle messages;

storage means coupled to the receiver means for storing a plurality of system configuration parameters, each set of system configuration parameters being associated with a unique paging system identification number;

comparison means for comparing the unique system identification information decoded by the decoder means with the unique paging system identification number presently being utilized by the pager;

controller means responsive to the comparison means for causing the pager to maintain receiving information messages from the presently selected paging system if the unique paging system identification number presently being utilized by the pager matches the unique system identification information decoded by the decoder means and for automatically changing the corresponding system configuration parameters of the pager if the unique pager system identification number presently being utilized does not match the unique system identification information decoded by the decoder means and the unique system identification information previously decoded matches one of the unique pager system identification numbers stored in the storage means; and counter means for generating a periodic pager counter interval during which the pager decodes information messages in order to determine if the pager is still in the proper paging system by comparing the unique system identification information with the unique paging system identification number presently being utilized by the pager.

2. The pager of claim 1, wherein the plurality of paging systems utilize the POCSAG paging protocol.

3. The pager of claim 2, wherein each of the system configuration parameters includes the frequency of operation of the pager and the pager code number for that system.

4. A method for selecting a paging system on which a pager having multiple paging system capability is to operate, each of the plurality of paging systems transmitting information messages which include idle messages during periods of idle system activity, each of the paging systems also having unique system identification information that is transmitted periodically via the idle messages, the pager having a plurality of system configuration parameters, each set of system configuration parameters being associated with a unique paging system identification number which is also stored in the pager, each set of system configuration parameters corresponding to a unique paging system, comprising the steps of:

presetting the pager to one of the plurality of system configuration parameters stored in the pager;

attempting to receive information messages from one of the plurality of paging system;

decoding any received information messages in order to determine the unique system identification information contained in the idle messages;

comparing the unique system identification information decoded with the unique paging system identification number which is part of the system configuration parameters presently being utilized by the pager;

maintaining the pager operating with the presently selected system configuration parameters if the system identification information that was decoded matches the unique paging system identification number associated with the preset system configuration parameters; and selecting a new set of system configuration parameters if the system identification information that was decoded does not match the unique paging system identification number.

5. The method of claim 4, wherein each of the plurality of paging systems utilize the POCSAG paging protocol.

6. The method of claim 5, wherein each of the system configuration parameters includes the frequency of operation of the pager and the pager code number for that system.

7. The method of claim 4, further comprising the step of:

generating a periodic pager counter interval during which the pager decodes information messages in order to determine if the pager is still in the proper paging system by comparing the unique system identification information with the unique paging system identification number presently being utilized by the pager.

8. The method of claim 7, wherein the periodic pager counter interval is generated after a predetermined length of time has elapsed after properly matching the system identification information that was previously decoded with the unique paging system identification number that is associated with the presently utilized system configuration parameters and the predetermined length of time being stored in the pager.

* * * * *